US012653280B2

(12) United States Patent
Huang

(10) Patent No.: US 12,653,280 B2
(45) Date of Patent: \*Jun. 16, 2026

(54) TEMPORARY RING INNER DIAMETER FILING DEVICE AND METHOD THEREOF

(71) Applicant: Putian Yinluoou E-commerce Co., Ltd, Putian (CN)

(72) Inventor: Zhong Huang, Putian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/222,131

(22) Filed: May 29, 2025

(65) Prior Publication Data

US 2026/0000166 A1 Jan. 1, 2026

Related U.S. Application Data

(63) Continuation-in-part of application No. 18/754,691, filed on Jun. 26, 2024.

(51) Int. Cl.
| | |
|---|---|
| *A44C 27/00* | (2006.01) |
| *B01J 19/12* | (2006.01) |
| *A44C 9/00* | (2006.01) |
| *A44C 17/02* | (2006.01) |

(52) U.S. Cl.
CPC ............ *A44C 27/00* (2013.01); *A44C 27/007* (2013.01); *B01J 19/123* (2013.01); *A44C 9/0084* (2013.01); *A44C 17/0225* (2013.01)

(58) Field of Classification Search
CPC . A44C 9/0084; A44C 27/007; A44C 17/0225; A44C 17/170216
See application file for complete search history.

(56) References Cited

FOREIGN PATENT DOCUMENTS

JP 2016112369 A * 6/2016

OTHER PUBLICATIONS

Amazon.com "Nylon Ring Clamp with Leather Jaws, 6 inches RCL-655.00," Amazon product available Jun. 27, 2011 (https://www.amazon.com/Nylon-Clamp-Leather-Inches-RCL-655-00/dp/B0058EDARS) (Year: 2011).*
Amazon.com "Ring Sizer for Loose Rings Ring Adjuster Ring Guards for Women Loose Rings Invisible Glue Ring Spacer Fit Any Rings," Amazon Product available Mar. 13, 2024 (https://www.amazon.com/Innovative-Adjuster-Adhesive-Adjusts-Application/dp/B0CXXQN8NS) (Year: 2024).*
English machine translation of JP2016112369 (Year: 2016).*

* cited by examiner

*Primary Examiner* — Scott W Dodds
(74) *Attorney, Agent, or Firm* — Nicholas Makridakis

(57) ABSTRACT

The present invention discloses a temporary ring inner diameter filling device and its application method, belonging to the field of jewelry repair technology. The device features a specially designed ring holder and clamping pads that securely fix the ring in place, ensuring smooth application and ultraviolet (UV) curing of UV-curable adhesive. The design allows the operator to easily control the ring's position and angle, enhancing the accuracy and uniformity of the filling effect. The use of UV-curable adhesive as the filling material provides excellent flexibility and adhesion, and leaves no visible marks or aesthetic impact after curing, thus preserving the original appearance of the ring. The application method includes a polishing step to ensure a smooth and even surface post-filling, improving the visual quality to meet aesthetic demands.

1 Claim, 2 Drawing Sheets

TEMPORARY RING INNER DIAMETER FILING DEVICE AND METHOD THEREOF

CROSS-REFERENCE TO RELATED APPLICATIONS

This application is a continuation-in-part (CIP) of U.S. patent application Ser. No. 18/754,691, filed on Jun. 26, 2024. The content of the aforementioned application, including any intervening amendments thereto, is incorporated herein by reference.

TECHNICAL FIELD

The present invention relates to the field of jewelry repair, and more particularly to a temporary ring inner diameter filling device and a method thereof.

BACKGROUND OF THE INVENTION

In the field of jewelry manufacturing and repair, ring size adjustment is a common service. Due to changes in finger size or specific ring design requirements, customers may require temporary or permanent filling of the ring's inner diameter to adjust its size. Traditional filling methods include welding metal inserts or using moldable materials. These methods often demand specialized skills and tools, and the procedures are typically cumbersome and time-consuming.

In response to this need, the present invention provides a temporary ring inner diameter filling device and its application method. The device utilizes ultraviolet (UV) curing technology in conjunction with a specially designed ring holder and clamping pad to quickly and evenly apply a layer of UV-curable adhesive to the inner wall of the ring. Upon exposure to UV light, the adhesive cures rapidly, thereby temporarily increasing the ring's inner diameter.

SUMMARY OF THE INVENTION

The objective of the present invention is to provide a temporary ring inner diameter filling device and an application method thereof, in order to address the issues presented in the background art.

To achieve the above objective, the invention provides the following technical solution: A temporary ring inner diameter filling device comprising an ultraviolet (UV) lamp and a ring holder. Two brackets are rotatably connected to the underside of the UV lamp, and a power cord is fixedly connected to a side of the UV lamp. Both ends of the ring holder are fixedly connected with clamping pads, wherein the clamping pads are used for securely holding a ring.

Compared with the prior art, the beneficial effects of the present invention are as follows:

Firstly, by utilizing UV curing technology, the device enables rapid and uniform application of a layer of UV-curable adhesive to the inner wall of a ring, which is then quickly cured under the UV lamp, thereby temporarily increasing the ring's inner diameter. Compared with traditional methods such as welding metal inserts or using moldable materials, this process is simpler and faster to operate, and eliminates the need for complex tools or techniques, significantly reducing time and labor costs.

Secondly, the use of a specially designed ring holder and clamping pads ensures stable fixation of the ring, enabling smooth application and curing of the UV adhesive. This design allows the operator to easily control the position and angle of the ring, enhancing the accuracy and uniformity of the filling process.

Moreover, the height of the UV lamp can be adjusted via the two brackets, allowing the device to flexibly accommodate rings of various sizes and improving overall adaptability.

Additionally, the UV-curable adhesive used as a temporary filler exhibits good flexibility and adhesion, forming a uniform filling layer that adheres closely to the ring's inner wall. Unlike conventional fillers, the cured adhesive leaves no visible traces and does not affect the ring's aesthetics, thus allowing temporary resizing while preserving the ring's original appearance.

Finally, the application method of the present invention further includes a polishing step for the cured adhesive, ensuring a smooth and even surface on the filled ring. This step improves the overall appearance quality of the ring, meeting customers' aesthetic expectations.

In conclusion, the temporary ring inner diameter filling device and application method provided by the present invention offer significant advantages in the field of jewelry making and repair. The invention simplifies the traditional ring resizing process, improves operational efficiency and accuracy, and maintains the ring's visual appeal and surface quality. These benefits contribute to broad market prospects and commercial value.

Figure 1:
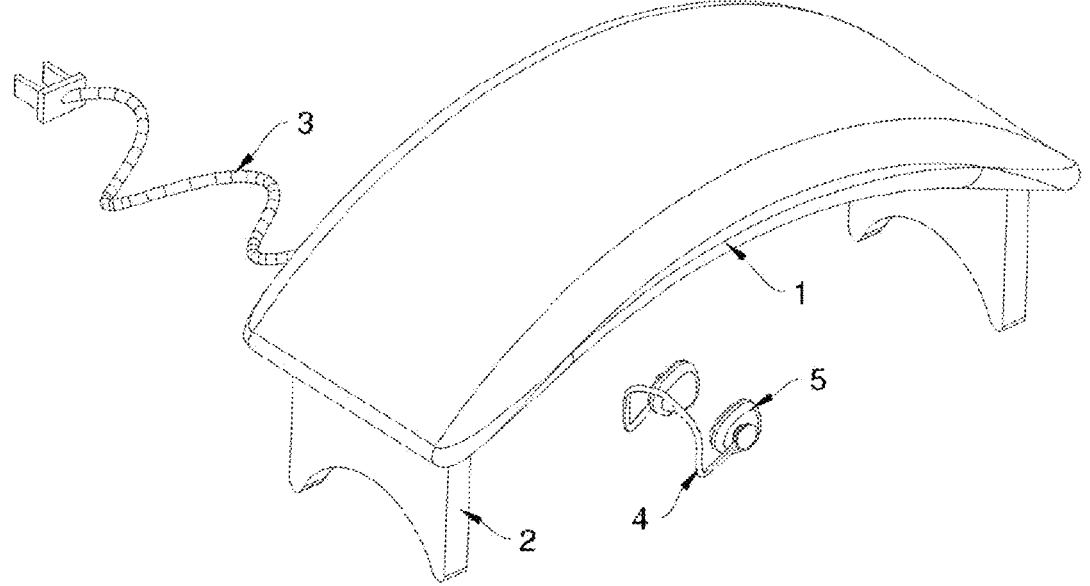
FIG. 1 is a front view of the device of the present invention.
Figure 2:
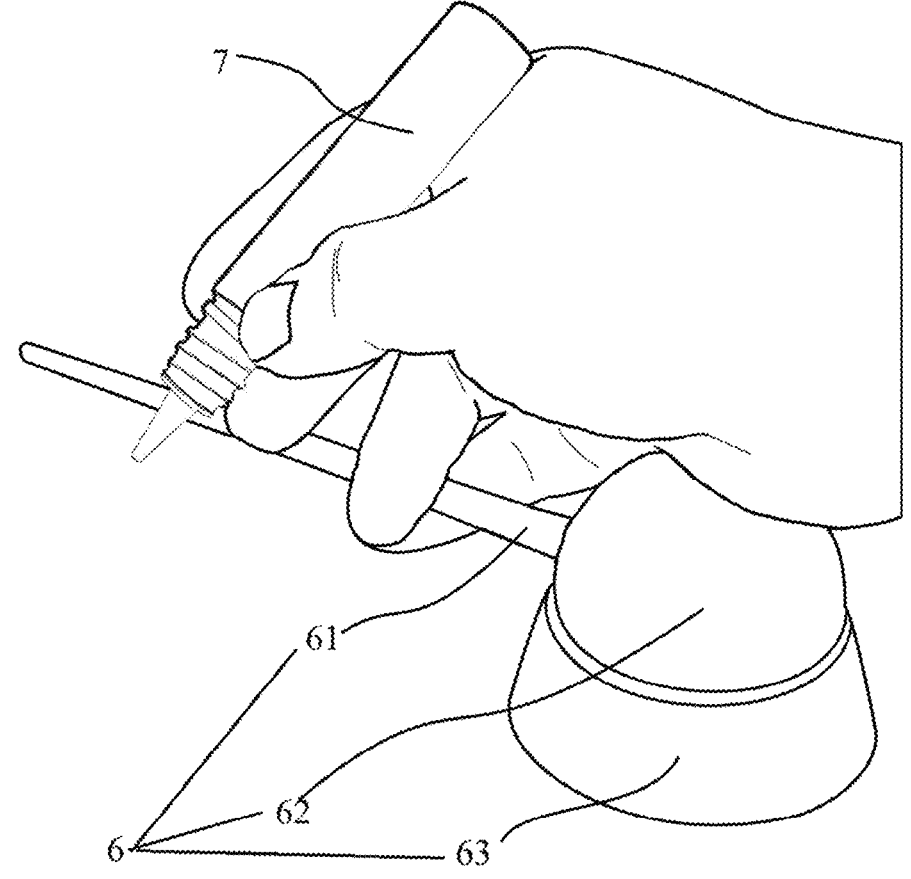
FIG. 2 is a schematic diagram showing the handheld dispensing stabilizer.

In the drawing: 1—UV lamp; 2—Bracket; 3—Power cord; 4—Ring holder; 5—Clamping pad.

DETAILED DESCRIPTION OF THE INVENTION

The technical solutions of the embodiments of the present invention will be clearly and completely described below in conjunction with the accompanying drawings. It should be understood that the described embodiments are merely part of the invention and not exhaustive. Based on these embodiments, all other embodiments obtained by those of ordinary skill in the art without creative effort fall within the scope of protection of the present invention.

Please refer to FIG. 1, the present invention provides a temporary ring inner diameter filling device, comprising a UV lamp 1 and a ring holder 4. Two brackets 2 are rotatably connected to the underside of the UV lamp 1. A power cord 3 is fixedly connected to a side of the UV lamp 1. Clamping pads 5 are fixedly connected to both ends of the ring holder 4 and are used to hold the ring. In this embodiment, the clamping pads 5 at both ends of the ring holder 4 securely hold the ring, allowing it to remain fixed beneath the UV lamp 1. In other embodiments, alternative means that enable the ring to stay fixed under the UV lamp 1 may also be used. For example, universal clay (also known as magic clay or modeling clay) can replace the ring holder 4 and its clamping pads 5 described above. The shaped clay can support the ring and keep it fixed under the UV lamp 1. In another embodiment, the ring may also be held manually by positioning it beneath the UV lamp 1 by hand during the curing process.

To address the issue of uneven dispensing caused by hand tremors during glue application, the present invention further provides a handheld dispensing stabilizer 6 designed to improve operational stability and accuracy during glue dispensing.

The handheld dispensing stabilizer 6 includes a support rod 61, a spherical universal joint (ball joint) 62, and a base 63. The support rod 61 provides indirect support for the glue bottle 7, helping maintain a stable position. The spherical universal joint 62 connects the support rod 61 to the base 63, allowing for 360° free rotation. The joint 62 can be locked at any desired angle to accommodate different user postures or dispensing positions. The base is mounted on a workbench or working surface, the base securely holds the stabilizer in place during operation. This stabilizer 6 features a simple structure and is easily adjustable, making it especially suitable for precision dispensing scenarios such as electronics packaging or small-component bonding.

An example method of using the handheld dispensing stabilizer 6 includes: The operator holds the glue bottle 7. The base 61 of the stabilizer 6 is fixed onto the bench. The angle of the ball joint 62 is adjusted to achieve the most ergonomic and effective dispensing posture. The operator then grips the stabilizer handle along with the glue bottle 7, which helps maintain a stable position and control the tilt angle, effectively reducing the impact of hand tremors and improving dispensing consistency and accuracy.

In this embodiment, the application method of the temporary ring inner diameter filling device includes the following steps:

a) placing the original ring on the user's finger and measure the gap between the finger and the ring;

b) removing the ring and evenly apply UV-curable adhesive to its inner wall; slowly rotating the ring to ensure even distribution of the adhesive along the inner circumference, with a thickness corresponding to the measured gap in step a). If the required adjustment exceeds 1 mm (approximately 40 mils), applying the adhesive in 2-3 separate layers;

c) raising the height of the UV lamp 1 using the two brackets 2 and connecting the power cord 3 to a power source; and d) inserting the adhesive-coated ring between the two clamping pads 5, positioning it directly beneath the UV lamp 1. After curing under the lamp for 2-3 minutes, turning off the UV lamp 1, waiting one minute, then removing the ring. After curing, cleaning the ring with an alcohol wipe or rinse with clean water to remove uncured residue, then polishing the surface.

Prior to measuring the gap between the ring and the finger in step a), the adhesive may be refrigerated for 5-10 minutes. Cooling reduces the fluidity of the adhesive and prevents dripping during use. The lower temperature decreases thermal motion of molecules (such as polymers and solvents), enhances intermolecular forces (such as van der Waals forces and hydrogen bonds), increases internal friction, and raises viscosity. Additionally, polymer chain mobility is reduced, and solvent viscosity increases, resulting in greater overall adhesive viscosity.

In step a), the gap between the ring and the finger can be determined either visually or using measuring tools. In this embodiment, visual estimation is employed.

After determining the gap, a cleaning tool may be used to wipe the ring's surface to remove debris from the contact area, which aids in proper adhesion and curing of the adhesive.

In step b), the adhesive may also be applied in a layered manner. First, drop adhesive into the inner circle of the ring while gently rotating it to evenly coat the surface. In some cases, the adhesive may be temporarily cured under the UV lamp for 5-20 seconds (depending on lamp power). This process may be repeated to apply multiple layers for stronger curing, particularly for larger gaps. The adhesive used is a UV-curable gel, which may be nail glue or a similar material.

In step d), the ring, after adhesive application, can be fixed using clamps or other tools (e.g., nail forms or clips), and placed under the UV lamp for curing. For a UV lamp of approximately 3 W power, a curing time of 180 seconds is sufficient. If curing is incomplete, repeat exposure may be used. Higher-powered UV lamps allow shorter curing durations. It should be noted that the curing efficiency of the photoinitiated polymerization depends on factors including wavelength compatibility, lamp power, adhesive layer properties, and environmental conditions.

After curing, remove residual adhesive from the ring using an alcohol wipe. The more complete the curing, the stronger the adhesion of the cured resin, and the less likely it is to cause post-curing exothermic reactions or skin irritation.

In specific embodiments, various existing UV lamps may be directly used for the curing process, including UV mouse lamps, handheld UV lamps, and UV nail lamps.

Additionally, the hardened adhesive may be removed post-curing through the following steps:

(1) soaking the ring in hot water for 5-10 minutes;

(2) using a small wooden stick or hard prying tool to create a small opening in the cured adhesive;

(3) gradually peeling and lifting the cured adhesive layer starting from the opening.

Furthermore, by employing ultraviolet curing technology, a layer of UV-curable adhesive can be rapidly and uniformly applied to the inner wall of a ring and cured by UV lamp irradiation, thereby temporarily increasing the inner diameter. Compared with conventional methods such as welding metal inserts or using moldable materials, this process is simpler, faster, and avoids the need for specialized tools or complex procedures, significantly saving time and labor costs. In the jewelry manufacturing and repair field, ring size adjustment is a common service. Due to variations in finger size or design needs, customers may require temporary or permanent filling of a ring's inner diameter. Traditional methods often require skilled labor and are time-consuming. The device of the present invention simplifies the process, enabling efficient and consistent results through UV-curable adhesive, reducing the dependence on technical expertise.

The use of a specially designed ring holder and clamping pads allows for stable fixation of the ring, ensuring the smooth application and curing of the adhesive. This design permits the operator to easily adjust the ring's position and angle, enhancing the accuracy and uniformity of the filling result. Since rings come in various shapes and sizes, the device must be adaptable. The adjustable height of the UV lamp via the dual brackets allows it to accommodate different ring sizes, improving the device's versatility and applicability.

The use of UV-curable adhesive as a temporary filling material offers excellent flexibility and adhesion, forming a uniform layer tightly bonded to the inner wall of the ring. Unlike conventional fillers, the cured adhesive does not leave visible marks or affect the ring's appearance, making it an ideal solution for temporary resizing while preserving the ring's original aesthetics. Maintaining the original look of the ring is crucial in the jewelry field. Traditional materials may compromise visual quality, whereas the adhesive used in this invention maintains visual integrity post-curing.

The foregoing disclosure outlines the fundamental principles, key features, and advantages of the present invention. It is understood by those skilled in the art that the invention is not limited to the described embodiments. These embodiments and the description serve to illustrate the principles of the invention. Various modifications and improvements may be made without departing from the spirit and scope of the invention, all of which fall within the scope of the appended claims and their equivalents.

What is claimed is:

1. A method for temporary ring inner diameter filling based on a temporary ring inner diameter filling device, the temporary ring inner diameter filling device comprising: a UV (ultraviolet) lamp and a ring holder; wherein the underside of the UV lamp is rotatably connected to two brackets; a power cord is fixedly connected to a side of the UV lamp; both ends of the ring holder are fixedly connected to clamping pads, the two clamping pads being configured to hold a ring; wherein the clamping pads are configured to secure the ring beneath the UV lamp to enable curing of UV-curable adhesive applied to the ring; the method comprises the following steps:

a) determining a gap to be temporarily filled in the ring;

b) evenly applying a UV-curable adhesive to the inner wall of the ring while slowly rotating the ring to ensure uniform distribution of the adhesive, the thickness of the adhesive corresponding to the gap determined in step a);

c) elevating the UV lamp using the two brackets and activating the UV lamp; and d) securing the adhesive-coated ring directly beneath the UV lamp, curing for 2-3 minutes, then turning off the UV lamp and waiting for 1 minute before removing the ring;

after confirming that the adhesive is cured on the inner wall of the ring, cleaning the ring with an alcohol wipe or rinsing with water to remove any uncured residue from the inner wall surface.

* * * * *